United States Patent Office.

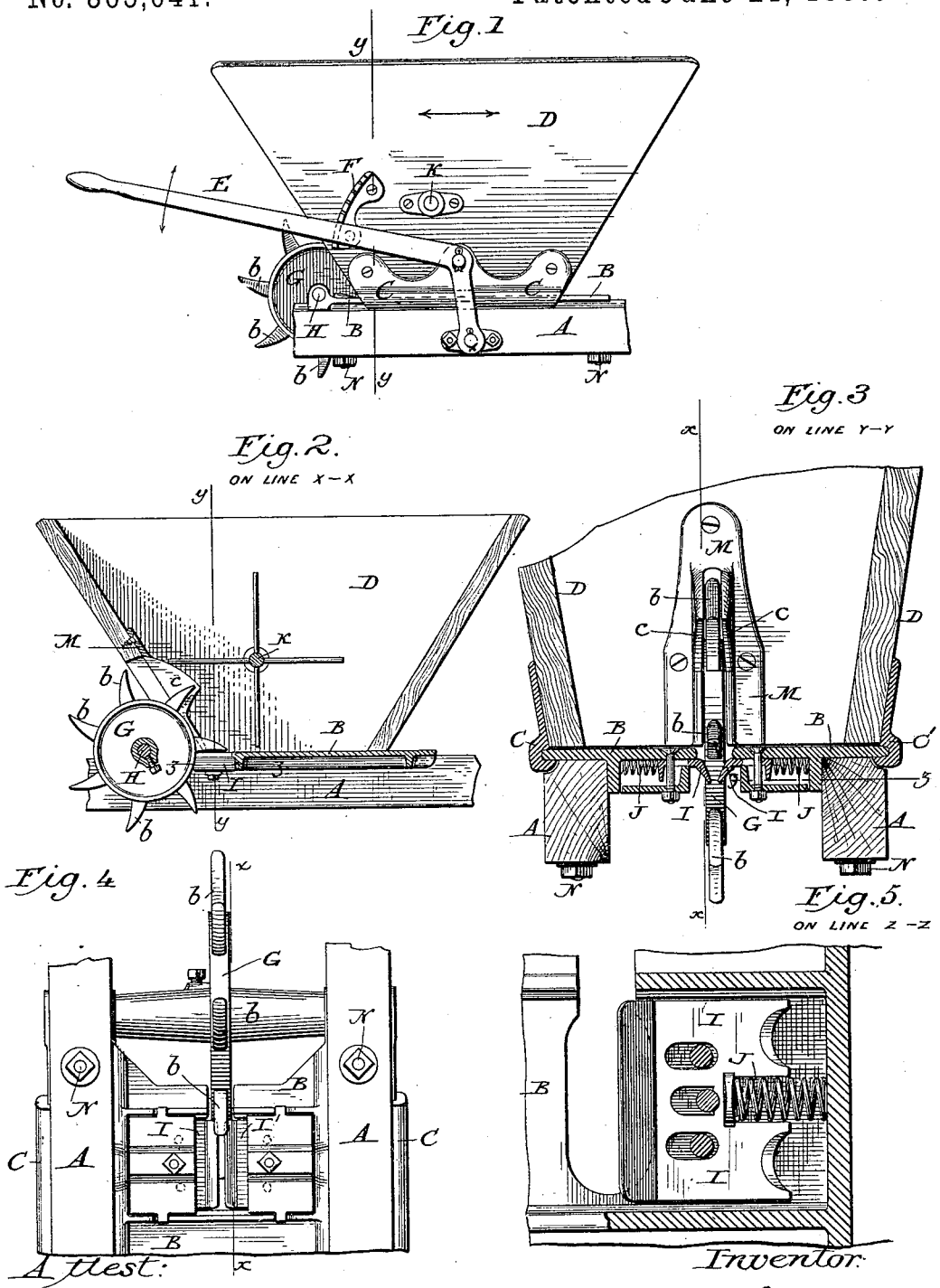

JOHN W. BARTLETT, OF MOLINE, ILLINOIS, ASSIGNOR TO THE MOLINE PLOW COMPANY, OF SAME PLACE.

COTTON-PLANTER.

SPECIFICATION forming part of Letters Patent No. 365,041, dated June 21, 1887.

Application filed February 14, 1887. Serial No. 227,475. (No model.)

*To all whom it may concern:*

Be it known that I, JOHN W. BARTLETT, of Moline, in the county of Rock Island and State of Illinois, have invented certain Improvements in Cotton-Planters, of which the following is a specification.

The aim of this invention is to provide a cotton-planter which shall be positive in its action, which may be quickly adjusted to deliver the seed with greater or less rapidity and under all conditions practically encountered, and which shall at the same time have its entire mechanism adapted for convenient application to and removal from a frame adapted to receive other seeding mechanisms.

To this end my invention consists, principally, in combining with a vertical wheel or disk a hopper having a slot through which the teeth of the wheel project from the outside to effect the discharge of the seed, the hopper being arranged to slide to and from the wheel in order to change the distance which the teeth project into the same, and thereby regulate the rate of feed, and combined with a lever or like means by which it may be operated and fixed at the will of the operator.

It also consists in combining with the wheel and hopper yielding throat-plates, as hereinafter described, and also in the peculiar construction of the plates supporting and connecting the various parts, whereby the convenient removal of the entire distributing mechanism from the supporting-frame is permitted.

As the general construction of the frame and the construction of the mechanism for imparting motion to the parts herein described may be of any suitable character and form no part of my invention, I have deemed it unnecessary to describe them herein.

In the accompanying drawings, Figure 1 is a side elevation of my seeding mechanism. Fig. 2 is a longitudinal vertical section of the same on the line $x\,x$ of Figs. 3 and 4. Fig. 3 is a transverse section on the line $y\,y$ of Figs. 1 and 2. Fig. 4 is a bottom plan view showing the feed-wheel, throat-plates, &c. Fig. 5 is a vertical transverse section on the line $z\,z$ of Figs. 2 and 3.

Referring to the drawings, A A represent horizontal frame-timbers, and B a base-plate bolted thereto, its horizontal parallel edges projecting outward beyond the timbers to receive and form guides for plates C C′, which are fastened to and form supports for the hopper or seed-box D. By means of these plates the hopper is connected to the frame in such manner that it may slide horizontally thereon, as indicated by the arrows. The movement may be effected by a hand-lever, E, pivoted to to the frame and to the hopper and engaging a rack-plate, F, on the latter, as shown in the drawings.

G represents the vertical feed wheel or disk, having at its periphery a series of radially-projecting fingers or teeth, $b$. This wheel is secured upon and driven by a horizontal shaft, H, supported in bearings cast on one end of the base-plate B, which is slotted to receive one edge of the wheel, and which also serves, as shown in Figs. 2 and 5, as the bottom of the hopper. The hopper is provided with a vertical slot, extending through one end and downward through the bottom, of suitable size to admit the teeth of the feed-wheel, which pass, as shown, through the upper end of the slot into the hopper, and face downward and outward through the bottom, carrying the seed with them and effecting its discharge.

In order to prevent the flow of seed through the slot or throat at the bottom, I provide on opposite sides of the wheel two horizontally-sliding throat-plates, I and I′, seated in suitable guides and urged constantly inward by spiral springs J. The inner beveled ends of these plates abutting against each other close the throat and prevent the accidental escape of seed; but as each of the feeding-teeth descends, urging the seed before it and between the beveled surface of the plates, the latter are forced apart, and thus the escape of the seed and the passage of the teeth permitted.

To insure the proper action of the teeth in delivering the seed, I recommend the employment, as shown, of a slotted plate, M, bolted to the inside of the hopper, and provided with two flanges or check-pieces, $c$, which lie on opposite sides of the path traversed by the incoming teeth. These plates should terminate, as shown, at a considerable distance above the bottom of the hopper. Aside from other functions, they serve to prevent the seed from working backward or outward over the upper edge of the wheel.

In order to insure the delivery of the seed to the teeth of the feed-wheel, I propose to pass through the hopper a horizontal shaft, K, having a series of agitator-arms, as shown; but it is to be understood that this agitator is not a necessary feature of the structure, the essence of the invention residing in the combination, with the feed-wheel, of the slotted sliding hopper moving to and from the wheel in order to vary the rate of feed.

It will be perceived that the base-plate B serves to support both the hopper and the shaft of the feed-wheel, or, in other words, all parts of my distributing mechanism, so that by simply removing the bolts N, which connect this plate to the frame, I am enabled to remove the entire distributer from the machine, and thus leave the frame in condition to receive devices for distributing corn or other seeds.

Having thus described my invention, what I claim is—

1. The feed-wheel having its shaft mounted in fixed bearings, in combination with the slotted sliding hopper, and the lever and its locking device for adjusting and holding the hopper.

2. The base-plate B, provided with shaft-bearings at one end, in combination with the shaft mounted therein, the feed-wheel mounted on said shaft, and the sliding hopper D, provided with plates engaging the base-plate, as described, the whole constituting a cotton-seed distributer adapted for application to and removal from the frame as a whole.

3. In combination with the hopper and feed-wheel, the sliding throat-plates I, beveled at their inner ends, and the springs urging said plates inward.

4. In combination with the feed-wheel, the slotted sliding hopper and the internal cheek-plates attached rigidly to the hopper, their upper edges extended to shield the wheel and their lower edges recessed to give the seed access to the wheel, as described.

In testimony whereof I hereunto set my hand, this 3d day of January, 1887, in the presence of two attesting witnesses.

JOHN W. BARTLETT.

Witnesses:
H. A. CROMPTON,
A. L. CARSON.